(12) United States Patent
Huang (10) Patent No.: US 8,692,854 B2
(45) Date of Patent: Apr. 8, 2014

(54) METHOD FOR GENERATING LOOKUP TABLE FOR COLOR CORRECTION FOR DISPLAY DEVICE

(75) Inventor: Chao-Fu Huang, Taiwan (TW)

(73) Assignee: Top Victory Investments Ltd., Harbour (HK)

( * ) Notice: Subject to any disclaimer, the term of this patent is extended or adjusted under 35 U.S.C. 154(b) by 484 days.

(21) Appl. No.: 13/049,959

(22) Filed: Mar. 17, 2011

(65) Prior Publication Data

US 2011/0227941 A1 Sep. 22, 2011

(30) Foreign Application Priority Data

Mar. 17, 2010 (TW) .................................. 99107887 A (51) Int. Cl.
*G09G 5/10* (2006.01)
(52) U.S. Cl.
USPC ............................ 345/690; 382/167; 382/274
(58) Field of Classification Search
None
See application file for complete search history.

(56) References Cited

U.S. PATENT DOCUMENTS

| | | | |
|---|---|---|---|
| 2007/0052735 A1* | 3/2007 | Chou | 345/690 |
| 2008/0272999 A1* | 11/2008 | Kurokawa et al. | 345/89 |
| 2009/0322662 A1* | 12/2009 | Yoshida et al. | 345/88 |

* cited by examiner

*Primary Examiner* — Aaron M Richer
*Assistant Examiner* — Weiming He
(74) *Attorney, Agent, or Firm* — Alan Kamrath; Kamrath IP Lawfirm, P.A.

(57) ABSTRACT

A method for generating a lookup table for color correction for a display device includes obtaining measured stimulus values for grayscales of primaries displayed on the display device, obtaining target stimulus values for the grayscales of the primaries, and obtaining the lookup table by comparing the measured stimulus values for the grayscales of the primaries and the target stimulus values for the grayscales of the primaries. The measured display characteristic is employed to calculate the corresponding lookup table for color correction for the display device for achieving a desired color temperature and brightness curve. It makes the adjustment of color temperature and brightness more accurate and quicker, to reduce cost.

16 Claims, 8 Drawing Sheets

| Grayscale | Lookup Table for Color Correction | | |
|---|---|---|---|
| | Red (R) | Green (G) | Blue (B) |
| 0 | 0 | 0 | 0 |
| 1 | 6 | 5 | 2 |
| 2 | 12 | 10 | 5 |
| 3 | 18 | 15 | 8 |
| 4 | 24 | 20 | 10 |
| 5 | 29 | 25 | 12 |
| 6 | 35 | 30 | 15 |
| 7 | 41 | 35 | 18 |
| 8 | 47 | 40 | 20 |
| 9 | 50 | 44 | 26 |
| ⋮ | ⋮ | ⋮ | ⋮ |
| 110 | 451 | 431 | 370 |
| 111 | 455 | 436 | 373 |
| 112 | 460 | 439 | 375 |
| 113 | 463 | 442 | 379 |
| 114 | 466 | 446 | 382 |
| 115 | 471 | 449 | 385 |
| 116 | 476 | 453 | 388 |
| 117 | 479 | 457 | 392 |
| 118 | 483 | 461 | 394 |
| 119 | 486 | 464 | 398 |
| 120 | 490 | 467 | 401 |
| 121 | 494 | 472 | 403 |
| 122 | 497 | 476 | 406 |
| 123 | 501 | 479 | 410 |
| 124 | 505 | 483 | 413 |
| 125 | 509 | 486 | 416 |
| 126 | 513 | 491 | 420 |
| 127 | 516 | 494 | 422 |
| 128 | 520 | 498 | 425 |
| 129 | 524 | 502 | 428 |
| 130 | 528 | 506 | 431 |
| ⋮ | ⋮ | ⋮ | ⋮ |
| 251 | 1004 | 954 | 801 |
| 252 | 1008 | 958 | 804 |
| 253 | 1013 | 962 | 808 |
| 254 | 1018 | 966 | 811 |
| 255 | 1023 | 970 | 814 |

| Grayscale | Measured Tristimulus Values for Grayscale | | | | | |
|---|---|---|---|---|---|---|
| 0 | 0.1102067 | $X_0''$ | 0.1072086 | $Y_0''$ | 0.2534775 | $Z_0''$ |
| 1 | 0.1125212 | $X_1''$ | 0.1098473 | $Y_1''$ | 0.2584093 | $Z_1''$ |
| 2 | 0.1154009 | $X_2''$ | 0.1122808 | $Y_2''$ | 0.2650617 | $Z_2''$ |
| 3 | 0.1211665 | $X_3''$ | 0.1189119 | $Y_3''$ | 0.2783336 | $Z_3''$ |
| 4 | 0.1301887 | $X_4''$ | 0.1269773 | $Y_4''$ | 0.2955254 | $Z_4''$ |
| 5 | 0.1446757 | $X_5''$ | 0.1407997 | $Y_5''$ | 0.3252799 | $Z_5''$ |
| 6 | 0.1653429 | $X_6''$ | 0.1616205 | $Y_6''$ | 0.3710163 | $Z_6''$ |
| 7 | 0.1959441 | $X_7''$ | 0.1920951 | $Y_7''$ | 0.4334343 | $Z_7''$ |
| 8 | 0.2380556 | $X_8''$ | 0.2340845 | $Y_8''$ | 0.5194263 | $Z_8''$ |
| 9 | 0.2901780 | $X_9''$ | 0.2862140 | $Y_9''$ | 0.6225350 | $Z_9''$ |
| ⋮ | ⋮ | ⋮ | ⋮ | ⋮ | ⋮ | ⋮ |
| 110 | 65.80502 | $X_{110}''$ | 67.33725 | $Y_{110}''$ | 100.1803 | $Z_{110}''$ |
| 111 | 67.46983 | $X_{111}''$ | 68.90108 | $Y_{111}''$ | 102.8562 | $Z_{111}''$ |
| 112 | 68.91891 | $X_{112}''$ | 70.39693 | $Y_{112}''$ | 105.1271 | $Z_{112}''$ |
| 113 | 70.34720 | $X_{113}''$ | 71.88656 | $Y_{113}''$ | 107.2236 | $Z_{113}''$ |
| 114 | 71.47121 | $X_{114}''$ | 73.04599 | $Y_{114}''$ | 108.9692 | $Z_{114}''$ |
| 115 | 72.96422 | $X_{115}''$ | 74.57596 | $Y_{115}''$ | 111.0403 | $Z_{115}''$ |
| 116 | 74.85323 | $X_{116}''$ | 76.47635 | $Y_{116}''$ | 113.9328 | $Z_{116}''$ |
| 117 | 75.94852 | $X_{117}''$ | 77.64703 | $Y_{117}''$ | 115.7195 | $Z_{117}''$ |
| 118 | 77.06774 | $X_{118}''$ | 78.79843 | $Y_{118}''$ | 117.4761 | $Z_{118}''$ |
| 119 | 78.99205 | $X_{119}''$ | 80.69373 | $Y_{119}''$ | 120.3855 | $Z_{119}''$ |
| 120 | 80.55903 | $X_{120}''$ | 82.36909 | $Y_{120}''$ | 122.8004 | $Z_{120}''$ |
| 121 | 82.51512 | $X_{121}''$ | 84.24507 | $Y_{121}''$ | 125.7869 | $Z_{121}''$ |
| 122 | 83.61919 | $X_{122}''$ | 85.33769 | $Y_{122}''$ | 127.7747 | $Z_{122}''$ |
| 123 | 85.59204 | $X_{123}''$ | 87.23672 | $Y_{123}''$ | 130.7655 | $Z_{123}''$ |
| 124 | 87.29087 | $X_{124}''$ | 89.00277 | $Y_{124}''$ | 133.2167 | $Z_{124}''$ |
| 125 | 88.41154 | $X_{125}''$ | 90.14036 | $Y_{125}''$ | 135.0447 | $Z_{125}''$ |
| 126 | 90.52225 | $X_{126}''$ | 92.24348 | $Y_{126}''$ | 138.3323 | $Z_{126}''$ |
| 127 | 91.74114 | $X_{127}''$ | 93.56725 | $Y_{127}''$ | 140.1849 | $Z_{127}''$ |
| 128 | 93.89738 | $X_{128}''$ | 95.69363 | $Y_{128}''$ | 143.4968 | $Z_{128}''$ |
| 129 | 95.69992 | $X_{129}''$ | 97.55778 | $Y_{129}''$ | 146.2714 | $Z_{129}''$ |
| 130 | 97.47184 | $X_{130}''$ | 99.40913 | $Y_{130}''$ | 148.8074 | $Z_{130}''$ |
| ⋮ | ⋮ | ⋮ | ⋮ | ⋮ | ⋮ | ⋮ |
| 251 | 429.4135 | $X_{251}''$ | 437.4398 | $Y_{251}''$ | 667.1019 | $Z_{251}''$ |
| 252 | 433.3848 | $X_{252}''$ | 441.4652 | $Y_{252}''$ | 673.5723 | $Z_{252}''$ |
| 253 | 436.8893 | $X_{253}''$ | 445.1139 | $Y_{253}''$ | 680.7727 | $Z_{253}''$ |
| 254 | 440.8886 | $X_{254}''$ | 449.2867 | $Y_{254}''$ | 688.2648 | $Z_{254}''$ |
| 255 | 443.8391 | $X_{255}''$ | 452.1523 | $Y_{255}''$ | 693.6162 | $Z_{255}''$ |

| Primary | Measured Tristimulus Values for Primary | | | | | |
|---|---|---|---|---|---|---|
| R255 | 185.0448 | $X_{R255}$ | 98.0262 | $Y_{R255}$ | 7.121009 | $Z_{R255}$ |
| G255 | 145.8495 | $X_{G255}$ | 311.0104 | $Y_{G255}$ | 70.13288 | $Z_{G255}$ |
| B255 | 111.1191 | $X_{B255}$ | 43.58617 | $Y_{B255}$ | 613.829 | $Z_{B255}$ |

FIG. 2

| Grayscale | Modified Measured Tristimulus Values for Grayscale | | | | | |
|---|---|---|---|---|---|---|
| 0 | 0.1097534 | $X_0$ | 0.1073202 | $Y_0$ | 0.2525517 | $Z_0$ |
| 1 | 0.1120584 | $X_1$ | 0.1099616 | $Y_1$ | 0.2574655 | $Z_1$ |
| 2 | 0.1149262 | $X_2$ | 0.1123976 | $Y_2$ | 0.2640936 | $Z_2$ |
| 3 | 0.1206681 | $X_3$ | 0.1190356 | $Y_3$ | 0.2773170 | $Z_3$ |
| 4 | 0.1296532 | $X_4$ | 0.1271094 | $Y_4$ | 0.2944460 | $Z_4$ |
| 5 | 0.1440806 | $X_5$ | 0.1409462 | $Y_5$ | 0.3240919 | $Z_5$ |
| 6 | 0.1646628 | $X_6$ | 0.1617887 | $Y_6$ | 0.3696612 | $Z_6$ |
| 7 | 0.1951381 | $X_7$ | 0.1922950 | $Y_7$ | 0.4318513 | $Z_7$ |
| 8 | 0.2370764 | $X_8$ | 0.2343281 | $Y_8$ | 0.5175292 | $Z_8$ |
| 9 | 0.2889844 | $X_9$ | 0.2865118 | $Y_9$ | 0.6202613 | $Z_9$ |
| ⋮ | ⋮ | ⋮ | ⋮ | ⋮ | ⋮ | ⋮ |
| 110 | 65.53434 | $X_{110}$ | 67.40732 | $Y_{110}$ | 99.81441 | $Z_{110}$ |
| 111 | 67.19230 | $X_{111}$ | 68.97277 | $Y_{111}$ | 102.4805 | $Z_{111}$ |
| 112 | 68.63542 | $X_{112}$ | 70.47018 | $Y_{112}$ | 104.7431 | $Z_{112}$ |
| 113 | 70.05783 | $X_{113}$ | 71.96136 | $Y_{113}$ | 106.8320 | $Z_{113}$ |
| 114 | 71.17722 | $X_{114}$ | 73.12200 | $Y_{114}$ | 108.5712 | $Z_{114}$ |
| 115 | 72.66409 | $X_{115}$ | 74.65356 | $Y_{115}$ | 110.6347 | $Z_{115}$ |
| 116 | 74.54533 | $X_{116}$ | 76.55592 | $Y_{116}$ | 113.5167 | $Z_{116}$ |
| 117 | 75.63611 | $X_{117}$ | 77.72782 | $Y_{117}$ | 115.2969 | $Z_{117}$ |
| 118 | 76.75073 | $X_{118}$ | 78.88042 | $Y_{118}$ | 117.0470 | $Z_{118}$ |
| 119 | 78.66712 | $X_{119}$ | 80.77769 | $Y_{119}$ | 119.9458 | $Z_{119}$ |
| 120 | 80.22766 | $X_{120}$ | 82.45480 | $Y_{120}$ | 122.3519 | $Z_{120}$ |
| 121 | 82.17570 | $X_{121}$ | 84.33273 | $Y_{121}$ | 125.3275 | $Z_{121}$ |
| 122 | 83.27523 | $X_{122}$ | 85.42648 | $Y_{122}$ | 127.3080 | $Z_{122}$ |
| 123 | 85.23996 | $X_{123}$ | 87.32749 | $Y_{123}$ | 130.2879 | $Z_{123}$ |
| 124 | 86.93181 | $X_{124}$ | 89.09538 | $Y_{124}$ | 132.7301 | $Z_{124}$ |
| 125 | 88.04787 | $X_{125}$ | 90.23415 | $Y_{125}$ | 134.5515 | $Z_{125}$ |
| 126 | 90.14989 | $X_{126}$ | 92.33946 | $Y_{126}$ | 137.8271 | $Z_{126}$ |
| 127 | 91.36377 | $X_{127}$ | 93.66461 | $Y_{127}$ | 139.6729 | $Z_{127}$ |
| 128 | 93.51114 | $X_{128}$ | 95.79320 | $Y_{128}$ | 142.9727 | $Z_{128}$ |
| 129 | 95.30627 | $X_{129}$ | 97.65929 | $Y_{129}$ | 145.7372 | $Z_{129}$ |
| 130 | 97.07090 | $X_{130}$ | 99.51257 | $Y_{130}$ | 148.2639 | $Z_{130}$ |
| ⋮ | ⋮ | ⋮ | ⋮ | ⋮ | ⋮ | ⋮ |
| 251 | 427.6471 | $X_{251}$ | 437.8950 | $Y_{251}$ | 664.6654 | $Z_{251}$ |
| 252 | 431.6021 | $X_{252}$ | 441.9245 | $Y_{252}$ | 671.1122 | $Z_{252}$ |
| 253 | 435.0922 | $X_{253}$ | 445.5770 | $Y_{253}$ | 678.2863 | $Z_{253}$ |
| 254 | 439.0750 | $X_{254}$ | 449.7542 | $Y_{254}$ | 685.7510 | $Z_{254}$ |
| 255 | 442.0134 | $X_{255}$ | 452.6228 | $Y_{255}$ | 691.0829 | $Z_{255}$ |

FIG. 3

| Grayscale of Red | Measured X Stimulus Value for Grayscale of Red | | Grayscale of Green | Measured Y Stimulus Value for Grayscale of Green | | Grayscale of Blue | Measured Z Stimulus Value for Grayscale of Blue | |
|---|---|---|---|---|---|---|---|---|
| R0 | 0.03292069 | $X_{R0}$ | G0 | 0.07320991 | $Y_{G0}$ | B0 | 0.2347760 | $Z_{B0}$ |
| R1 | 0.03346806 | $X_{R1}$ | G1 | 0.07524661 | $Y_{G1}$ | B1 | 0.2392094 | $Z_{B1}$ |
| R2 | 0.03453231 | $X_{R2}$ | G2 | 0.07667395 | $Y_{G2}$ | B2 | 0.2454747 | $Z_{B2}$ |
| R3 | 0.03566942 | $X_{R3}$ | G3 | 0.08185670 | $Y_{G3}$ | B3 | 0.2574857 | $Z_{B3}$ |
| R4 | 0.03946747 | $X_{R4}$ | G4 | 0.08679157 | $Y_{G4}$ | B4 | 0.2733556 | $Z_{B4}$ |
| R5 | 0.04464756 | $X_{R5}$ | G5 | 0.09593989 | $Y_{G5}$ | B5 | 0.3007393 | $Z_{B5}$ |
| R6 | 0.05076526 | $X_{R6}$ | G6 | 0.11055660 | $Y_{G6}$ | B6 | 0.3427770 | $Z_{B6}$ |
| R7 | 0.06106386 | $X_{R7}$ | G7 | 0.13155570 | $Y_{G7}$ | B7 | 0.3998356 | $Z_{B7}$ |
| R8 | 0.07518765 | $X_{R8}$ | G8 | 0.16052560 | $Y_{G8}$ | B8 | 0.4784373 | $Z_{B8}$ |
| R9 | 0.09323025 | $X_{R9}$ | G9 | 0.19648170 | $Y_{G9}$ | B9 | 0.5723669 | $Z_{B9}$ |
| ⋮ | ⋮ | ⋮ | ⋮ | ⋮ | ⋮ | ⋮ | ⋮ | ⋮ |
| R110 | 27.78492 | $X_{R110}$ | G110 | 46.42013 | $Y_{G110}$ | B110 | 88.27744 | $Z_{B110}$ |
| R111 | 28.53985 | $X_{R111}$ | G111 | 47.41433 | $Y_{G111}$ | B111 | 90.69029 | $Z_{B111}$ |
| R112 | 29.13157 | $X_{R112}$ | G112 | 48.45592 | $Y_{G112}$ | B112 | 92.69522 | $Z_{B112}$ |
| R113 | 29.73387 | $X_{R113}$ | G113 | 49.49804 | $Y_{G113}$ | B113 | 94.52593 | $Z_{B113}$ |
| R114 | 30.19645 | $X_{R114}$ | G114 | 50.30431 | $Y_{G114}$ | B114 | 96.06557 | $Z_{B114}$ |
| R115 | 30.86514 | $X_{R115}$ | G115 | 51.35374 | $Y_{G115}$ | B115 | 97.86663 | $Z_{B115}$ |
| R116 | 31.67805 | $X_{R116}$ | G116 | 52.64370 | $Y_{G116}$ | B116 | 100.4265 | $Z_{B116}$ |
| R117 | 32.08870 | $X_{R117}$ | G117 | 53.48628 | $Y_{G117}$ | B117 | 102.0009 | $Z_{B117}$ |
| R118 | 32.54748 | $X_{R118}$ | G118 | 54.28562 | $Y_{G118}$ | B118 | 103.5530 | $Z_{B118}$ |
| R119 | 33.40600 | $X_{R119}$ | G119 | 55.54477 | $Y_{G119}$ | B119 | 106.1349 | $Z_{B119}$ |
| R120 | 34.02089 | $X_{R120}$ | G120 | 56.74622 | $Y_{G120}$ | B120 | 108.2464 | $Z_{B120}$ |
| R121 | 34.91677 | $X_{R121}$ | G121 | 57.96016 | $Y_{G121}$ | B121 | 110.9138 | $Z_{B121}$ |
| R122 | 35.34402 | $X_{R122}$ | G122 | 58.69995 | $Y_{G122}$ | B122 | 112.7111 | $Z_{B122}$ |
| R123 | 36.24778 | $X_{R123}$ | G123 | 59.93283 | $Y_{G123}$ | B123 | 115.3781 | $Z_{B123}$ |
| R124 | 36.97577 | $X_{R124}$ | G124 | 61.16335 | $Y_{G124}$ | B124 | 117.5148 | $Z_{B124}$ |
| R125 | 37.43029 | $X_{R125}$ | G125 | 61.94577 | $Y_{G125}$ | B125 | 119.1423 | $Z_{B125}$ |
| R126 | 38.33930 | $X_{R126}$ | G126 | 63.36212 | $Y_{G126}$ | B126 | 122.0635 | $Z_{B126}$ |
| R127 | 38.81092 | $X_{R127}$ | G127 | 64.32304 | $Y_{G127}$ | B127 | 123.6745 | $Z_{B127}$ |
| R128 | 39.76128 | $X_{R128}$ | G128 | 65.73914 | $Y_{G128}$ | B128 | 126.6184 | $Z_{B128}$ |
| R129 | 40.50521 | $X_{R129}$ | G129 | 67.03767 | $Y_{G129}$ | B129 | 129.0614 | $Z_{B129}$ |
| R130 | 41.26324 | $X_{R130}$ | G130 | 68.33278 | $Y_{G130}$ | B130 | 131.2670 | $Z_{B130}$ |
| ⋮ | ⋮ | ⋮ | ⋮ | ⋮ | ⋮ | ⋮ | ⋮ | ⋮ |
| R251 | 179.8176 | $X_{R251}$ | G251 | 300.7490 | $Y_{G251}$ | B251 | 589.9266 | $Z_{B251}$ |
| R252 | 181.4332 | $X_{R252}$ | G252 | 303.5135 | $Y_{G252}$ | B252 | 595.6878 | $Z_{B252}$ |
| R253 | 182.5120 | $X_{R253}$ | G253 | 306.1299 | $Y_{G253}$ | B253 | 602.2303 | $Z_{B253}$ |
| R254 | 183.8796 | $X_{R254}$ | G254 | 309.1040 | $Y_{G254}$ | B254 | 608.9719 | $Z_{B254}$ |
| R255 | 185.0448 | $X_{R255}$ | G255 | 311.0104 | $Y_{G255}$ | B255 | 613.8290 | $Z_{B255}$ |

FIG. 4

| Grayscale | Target Tristimulus Values for Grayscale | | | | | |
|---|---|---|---|---|---|---|
| 0 | 0.1021010 | $X_0'$ | 0.1073202 | $Y_0'$ | 0.116780 | $Z_0'$ |
| 1 | 0.1040353 | $X_1'$ | 0.1093534 | $Y_1'$ | 0.1189924 | $Z_1'$ |
| 2 | 0.1109886 | $X_2'$ | 0.1166622 | $Y_2'$ | 0.1269455 | $Z_2'$ |
| 3 | 0.1237874 | $X_3'$ | 0.1301152 | $Y_3'$ | 0.1415843 | $Z_3'$ |
| 4 | 0.1429379 | $X_4'$ | 0.1502446 | $Y_4'$ | 0.1634881 | $Z_4'$ |
| 5 | 0.1688208 | $X_5'$ | 0.1774506 | $Y_5'$ | 0.1930922 | $Z_5'$ |
| 6 | 0.2017456 | $X_6'$ | 0.2120584 | $Y_6'$ | 0.2307505 | $Z_6'$ |
| 7 | 0.2419749 | $X_7'$ | 0.2543442 | $Y_7'$ | 0.2767636 | $Z_7'$ |
| 8 | 0.2897382 | $X_8'$ | 0.3045491 | $Y_8'$ | 0.3313939 | $Z_8'$ |
| 9 | 0.3452399 | $X_9'$ | 0.3628880 | $Y_9'$ | 0.3948751 | $Z_9'$ |
| ⋮ | ⋮ | ⋮ | ⋮ | ⋮ | ⋮ | ⋮ |
| 110 | 60.02392 | $X_{110}'$ | 63.09224 | $Y_{110}'$ | 68.65356 | $Z_{110}'$ |
| 111 | 61.22890 | $X_{111}'$ | 64.35881 | $Y_{111}'$ | 70.03178 | $Z_{111}'$ |
| 112 | 62.44698 | $X_{112}'$ | 65.63915 | $Y_{112}'$ | 71.42498 | $Z_{112}'$ |
| 113 | 63.67817 | $X_{113}'$ | 66.93328 | $Y_{113}'$ | 72.83318 | $Z_{113}'$ |
| 114 | 64.92251 | $X_{114}'$ | 68.24123 | $Y_{114}'$ | 74.25642 | $Z_{114}'$ |
| 115 | 66.18002 | $X_{115}'$ | 69.56302 | $Y_{115}'$ | 75.69472 | $Z_{115}'$ |
| 116 | 67.45071 | $X_{116}'$ | 70.89867 | $Y_{116}'$ | 77.14810 | $Z_{116}'$ |
| 117 | 68.73463 | $X_{117}'$ | 72.24821 | $Y_{117}'$ | 78.61660 | $Z_{117}'$ |
| 118 | 70.03177 | $X_{118}'$ | 73.61167 | $Y_{118}'$ | 80.10024 | $Z_{118}'$ |
| 119 | 71.34218 | $X_{119}'$ | 74.98907 | $Y_{119}'$ | 81.59905 | $Z_{119}'$ |
| 120 | 72.66587 | $X_{120}'$ | 76.38042 | $Y_{120}'$ | 83.11304 | $Z_{120}'$ |
| 121 | 74.00285 | $X_{121}'$ | 77.78575 | $Y_{121}'$ | 84.64225 | $Z_{121}'$ |
| 122 | 75.35317 | $X_{122}'$ | 79.20509 | $Y_{122}'$ | 86.18670 | $Z_{122}'$ |
| 123 | 76.71684 | $X_{123}'$ | 80.63847 | $Y_{123}'$ | 87.74642 | $Z_{123}'$ |
| 124 | 78.09387 | $X_{124}'$ | 82.08589 | $Y_{124}'$ | 89.32143 | $Z_{124}'$ |
| 125 | 79.48430 | $X_{125}'$ | 83.54739 | $Y_{125}'$ | 90.91176 | $Z_{125}'$ |
| 126 | 80.88813 | $X_{126}'$ | 85.02299 | $Y_{126}'$ | 92.51742 | $Z_{126}'$ |
| 127 | 82.30540 | $X_{127}'$ | 86.51271 | $Y_{127}'$ | 94.13846 | $Z_{127}'$ |
| 128 | 83.73613 | $X_{128}'$ | 88.01657 | $Y_{128}'$ | 95.77487 | $Z_{128}'$ |
| 129 | 85.18034 | $X_{129}'$ | 89.53460 | $Y_{129}'$ | 97.42671 | $Z_{129}'$ |
| 130 | 86.63803 | $X_{130}'$ | 91.06681 | $Y_{130}'$ | 99.09398 | $Z_{130}'$ |
| ⋮ | ⋮ | ⋮ | ⋮ | ⋮ | ⋮ | ⋮ |
| 251 | 368.0644 | $X_{251}'$ | 386.8792 | $Y_{251}'$ | 420.9810 | $Z_{251}'$ |
| 252 | 371.2972 | $X_{252}'$ | 390.2773 | $Y_{252}'$ | 424.6786 | $Z_{252}'$ |
| 253 | 374.5456 | $X_{253}'$ | 393.6917 | $Y_{253}'$ | 428.3940 | $Z_{253}'$ |
| 254 | 377.8093 | $X_{254}'$ | 397.1223 | $Y_{254}'$ | 432.1270 | $Z_{254}'$ |
| 255 | 381.0885 | $X_{255}'$ | 400.5691 | $Y_{255}'$ | 435.8776 | $Z_{255}'$ |

FIG. 5

| Grayscale of Red | Target X Stimulus Value for Grayscale of Red | | Grayscale of Green | Target Y Stimulus Value for Grayscale of Green | | Grayscale of Blue | Target Z Stimulus Value for Grayscale of Blue | |
|---|---|---|---|---|---|---|---|---|
| R0 | 0.049590 | $X_{R0}'$ | G0 | 0.074080 | $Y_{G0}'$ | B0 | 0.098167 | $Z_{B0}'$ |
| R1 | 0.050530 | $X_{R1}'$ | G1 | 0.075483 | $Y_{G1}'$ | B1 | 0.100027 | $Z_{B1}'$ |
| R2 | 0.053907 | $X_{R2}'$ | G2 | 0.080528 | $Y_{G2}'$ | B2 | 0.106712 | $Z_{B2}'$ |
| R3 | 0.060123 | $X_{R3}'$ | G3 | 0.089814 | $Y_{G3}'$ | B3 | 0.119018 | $Z_{B3}'$ |
| R4 | 0.069425 | $X_{R4}'$ | G4 | 0.103709 | $Y_{G4}'$ | B4 | 0.137430 | $Z_{B4}'$ |
| R5 | 0.081996 | $X_{R5}'$ | G5 | 0.122488 | $Y_{G5}'$ | B5 | 0.162316 | $Z_{B5}'$ |
| R6 | 0.097988 | $X_{R6}'$ | G6 | 0.146377 | $Y_{G6}'$ | B6 | 0.193972 | $Z_{B6}'$ |
| R7 | 0.117527 | $X_{R7}'$ | G7 | 0.175565 | $Y_{G7}'$ | B7 | 0.232651 | $Z_{B7}'$ |
| R8 | 0.140726 | $X_{R8}'$ | G8 | 0.210220 | $Y_{G8}'$ | B8 | 0.278574 | $Z_{B8}'$ |
| R9 | 0.167683 | $X_{R9}'$ | G9 | 0.250489 | $Y_{G9}'$ | B9 | 0.331937 | $Z_{B9}'$ |
| ⋮ | ⋮ | | ⋮ | ⋮ | | ⋮ | ⋮ | |
| R110 | 29.15357 | $X_{R110}'$ | G110 | 43.55045 | $Y_{G110}'$ | B110 | 57.71102 | $Z_{B110}'$ |
| R111 | 29.73882 | $X_{R111}'$ | G111 | 44.42472 | $Y_{G111}'$ | B111 | 58.86957 | $Z_{B111}'$ |
| R112 | 30.33044 | $X_{R112}'$ | G112 | 45.30850 | $Y_{G112}'$ | B112 | 60.04071 | $Z_{B112}'$ |
| R113 | 30.92843 | $X_{R113}'$ | G113 | 46.20179 | $Y_{G113}'$ | B113 | 61.22446 | $Z_{B113}'$ |
| R114 | 31.53281 | $X_{R114}'$ | G114 | 47.10463 | $Y_{G114}'$ | B114 | 62.42086 | $Z_{B114}'$ |
| R115 | 32.14358 | $X_{R115}'$ | G115 | 48.01701 | $Y_{G115}'$ | B115 | 63.62991 | $Z_{B115}'$ |
| R116 | 32.76076 | $X_{R116}'$ | G116 | 48.93897 | $Y_{G116}'$ | B116 | 64.85164 | $Z_{B116}'$ |
| R117 | 33.38436 | $X_{R117}'$ | G117 | 49.87051 | $Y_{G117}'$ | B117 | 66.08607 | $Z_{B117}'$ |
| R118 | 34.01437 | $X_{R118}'$ | G118 | 50.81166 | $Y_{G118}'$ | B118 | 67.33324 | $Z_{B118}'$ |
| R119 | 34.65083 | $X_{R119}'$ | G119 | 51.76243 | $Y_{G119}'$ | B119 | 68.59316 | $Z_{B119}'$ |
| R120 | 35.29376 | $X_{R120}'$ | G120 | 52.72283 | $Y_{G120}'$ | B120 | 69.86584 | $Z_{B120}'$ |
| R121 | 35.94312 | $X_{R121}'$ | G121 | 53.69289 | $Y_{G121}'$ | B121 | 71.15131 | $Z_{B121}'$ |
| R122 | 36.59897 | $X_{R122}'$ | G122 | 54.67262 | $Y_{G122}'$ | B122 | 72.44960 | $Z_{B122}'$ |
| R123 | 37.26130 | $X_{R123}'$ | G123 | 55.66202 | $Y_{G123}'$ | B123 | 73.76072 | $Z_{B123}'$ |
| R124 | 37.93013 | $X_{R124}'$ | G124 | 56.66113 | $Y_{G124}'$ | B124 | 75.08469 | $Z_{B124}'$ |
| R125 | 38.60546 | $X_{R125}'$ | G125 | 57.66996 | $Y_{G125}'$ | B125 | 76.42154 | $Z_{B125}'$ |
| R126 | 39.28730 | $X_{R126}'$ | G126 | 58.68851 | $Y_{G126}'$ | B126 | 77.77128 | $Z_{B126}'$ |
| R127 | 39.97567 | $X_{R127}'$ | G127 | 59.71682 | $Y_{G127}'$ | B127 | 79.13394 | $Z_{B127}'$ |
| R128 | 40.67057 | $X_{R128}'$ | G128 | 60.75488 | $Y_{G128}'$ | B128 | 80.50953 | $Z_{B128}'$ |
| R129 | 41.37202 | $X_{R129}'$ | G129 | 61.80272 | $Y_{G129}'$ | B129 | 81.89809 | $Z_{B129}'$ |
| R130 | 42.08002 | $X_{R130}'$ | G130 | 62.86036 | $Y_{G130}'$ | B130 | 83.29961 | $Z_{B130}'$ |
| ⋮ | ⋮ | | ⋮ | ⋮ | | ⋮ | ⋮ | |
| R251 | 178.76860 | $X_{R251}'$ | G251 | 267.04970 | $Y_{G251}'$ | B251 | 353.88180 | $Z_{B251}'$ |
| R252 | 180.33880 | $X_{R252}'$ | G252 | 269.39530 | $Y_{G252}'$ | B252 | 356.99010 | $Z_{B252}'$ |
| R253 | 181.91650 | $X_{R253}'$ | G253 | 271.75210 | $Y_{G253}'$ | B253 | 360.11320 | $Z_{B253}'$ |
| R254 | 183.50170 | $X_{R254}'$ | G254 | 274.12010 | $Y_{G254}'$ | B254 | 363.25120 | $Z_{B254}'$ |
| R255 | 185.09440 | $X_{R255}'$ | G255 | 276.49940 | $Y_{G255}'$ | B255 | 366.40410 | $Z_{B255}'$ |

FIG. 6

| Grayscale | Lookup Table for Color Correction | | |
|---|---|---|---|
| | Red (R) | Green (G) | Blue (B) |
| 0 | 0 | 0 | 0 |
| 1 | 6 | 5 | 2 |
| 2 | 12 | 10 | 5 |
| 3 | 18 | 15 | 8 |
| 4 | 24 | 20 | 10 |
| 5 | 29 | 25 | 12 |
| 6 | 35 | 30 | 15 |
| 7 | 41 | 35 | 18 |
| 8 | 47 | 40 | 20 |
| 9 | 50 | 44 | 26 |
| ⋮ | ⋮ | ⋮ | ⋮ |
| 110 | 451 | 431 | 370 |
| 111 | 455 | 436 | 373 |
| 112 | 460 | 439 | 375 |
| 113 | 463 | 442 | 379 |
| 114 | 466 | 446 | 382 |
| 115 | 471 | 449 | 385 |
| 116 | 476 | 453 | 388 |
| 117 | 479 | 457 | 392 |
| 118 | 483 | 461 | 394 |
| 119 | 486 | 464 | 398 |
| 120 | 490 | 467 | 401 |
| 121 | 494 | 472 | 403 |
| 122 | 497 | 476 | 406 |
| 123 | 501 | 479 | 410 |
| 124 | 505 | 483 | 413 |
| 125 | 509 | 486 | 416 |
| 126 | 513 | 491 | 420 |
| 127 | 516 | 494 | 422 |
| 128 | 520 | 498 | 425 |
| 129 | 524 | 502 | 428 |
| 130 | 528 | 506 | 431 |
| ⋮ | ⋮ | ⋮ | ⋮ |
| 251 | 1004 | 954 | 801 |
| 252 | 1008 | 958 | 804 |
| 253 | 1013 | 962 | 808 |
| 254 | 1018 | 966 | 811 |
| 255 | 1023 | 970 | 814 |

FIG. 7

METHOD FOR GENERATING LOOKUP TABLE FOR COLOR CORRECTION FOR DISPLAY DEVICE

BACKGROUND OF THE INVENTION

1. Field of the Invention

The present invention relates to color correction for a display device and, more particularly, to a method for generating a lookup table for color correction for a display device.

2. Description of the Related Art

In manufacturing display devices such as liquid crystal displays (LCDs), it is generally very difficult for the manufactured display devices to have identical luminous ratios of red, green and blue primary light sources. As a result, the manufactured display devices cannot exhibit identical color performance even though they are manufactured in the same batch and the same process by the same manufacturer. Thus, the manufactured display devices must undergo a white balance adjustment before they become finished products.

Nowadays, a method for the white balance adjustment commonly used in manufacturing display devices includes the following steps. First, a half-black and half-white image signal is inputted to a display device to be adjusted. Next, an instrument is used to measure the image displayed on the display device to obtain deviations of chromaticity coordinates of bright and dark brightnesses with respect to the chromaticity coordinate of a reference white. Finally, according to the deviations, gain and offset parameters for the red, green and blue primary light sources are repeatedly adjusted to change driving voltages for the red, green and blue primary light sources to cause the white under the bright and dark brightnesses to be identical to the reference white.

However, the above method for the white balance adjustment only adjusts the white balance under the bright and dark brightnesses and results in inaccurate color temperatures for shades between, but not including, the bright and dark brightnesses, so that the adjusted display devices still cannot exhibit identical color performance. Moreover, the above method does not provide brightness curve adjustment for the display devices. In addition, today, the display devices each generally supports several video interfaces such as a video graphics array (VGA), a digital visual interface (DVI) and a high-definition multimedia interface (HDMI), and each video interface typically supports several color temperature modes such as cool (12000K), normal (9300K) and warm (6500K). If the white balance is manually adjusted interface by interface and mode by mode, it will take a long time for the display devices to adjust the white balances.

SUMMARY OF THE INVENTION

Accordingly, a method for generating a lookup table for color correction for a display device is provided for quickly and accurately adjusting the color temperature and the brightness curve of the display device.

According to an aspect of the present invention, a method for generating a lookup table for color correction for a display device includes: measuring tristimulus values for grayscales and tristimulus values for primaries displayed on the display device; calculating measured stimulus values for the grayscales of the primaries according to the measured tristimulus values for the grayscales and the measured tristimulus values for the primaries; calculating a target maximum luminance value according to a target color temperature value and the measured tristimulus values for a maximum grayscale; calculating target tristimulus values for the grayscales according to the target maximum luminance value, the target color temperature value and a target gamma value; calculating target stimulus values for the grayscales of the primaries according to the target tristimulus values for the grayscales and the measured tristimulus values for the primaries; when the target stimulus value for one grayscale of one primary is between measured stimulus values for two adjacent grayscales of the one primary, using an interpolation method to calculate a sub-grayscale corresponding to the target stimulus value for the one grayscale of the one primary and between the two adjacent grayscales of the one primary, rounding the sub-grayscale to be a lookup value and then filling the lookup value in a cell corresponding to the one grayscale of the one primary in the lookup table; when each of the target stimulus values for a minimum grayscale to one grayscale of one primary is not between measured stimulus values for two adjacent grayscales of the one primary, setting a lookup value corresponding to the minimum grayscale of the one primary to be zero, taking a linear relationship between the lookup values corresponding to the minimum grayscale of the one primary and a grayscale next to the one grayscale of the one primary, and then filling in cells corresponding to the minimum grayscale to the one grayscale of the one primary in the lookup table.

In one embodiment, calculating the measured stimulus values for the grayscales of the primaries further includes: modifying the measured tristimulus values for the grayscales according to the measured tristimulus values for the maximum grayscale and the measured tristimulus values for the primaries; and replacing the measured tristimulus values for the grayscales by the modified measured tristimulus values for the grayscales.

In one embodiment, before rounding the sub-grayscale to be the lookup value, the method further includes: modifying the sub-grayscale to be a modified sub-grayscale by multiplying the sub-grayscale by a gain value and then adding an offset value; and rounding the modified sub-grayscale to be a lookup value and then filling the lookup value in the cell corresponding to the one grayscale of the one primary in the lookup table.

In one embodiment, the tristimulus values include X, Y and Z stimulus values. In alternative embodiments, the tristimulus values are replaced by xyY, Luv or Lab values derived from the X, Y and Z stimulus values.

In one embodiment, the primaries include red, green and blue. The display device includes an LCD monitor or an LCD television.

The present invention employs the measured display characteristic to calculate the corresponding lookup table for color correction for the display device for achieving a desired color temperature and brightness curve. It makes the adjustment of color temperature and brightness more accurate and quicker to reduce cost.

BRIEF DESCRIPTION OF THE DRAWINGS

The foregoing and other features of the disclosure will be apparent and easily understood from a further reading of the specification and claims and by reference to the accompanying drawings in which:

FIG. 2 is a table illustrating the measured tristimulus values for the grayscales and the measured tristimulus values for the primaries obtained according to the step S11 shown in FIG. 1A;

FIG. 3 is a table illustrating the modified measured tristimulus values for the grayscales obtained according to the step S12 shown in FIG. 1A;

FIG. 4 is a table illustrating the measured stimulus values for the grayscales of the primaries obtained according to the step S13 shown in FIG. 1A;

FIG. 5 is a table illustrating the target tristimulus values for the grayscales obtained according to the step S22 shown in FIG. 1A;

FIG. 6 is a table illustrating the target tristimulus values for the grayscales of the primaries obtained according to the step S23 shown in FIG. 1A.

DETAILED DESCRIPTION OF THE INVENTION

In the following embodiments, for convenience of explanation and not intending to be limiting, display devices use red (R), green (G) and blue (B) primaries to produce the other colors by additive color mixing. A color of each pixel of images displayed on display devices is represented in a 24-bit RGB value and expressed as a triplet (r, g, b), where r, g and b are red, green and blue components, respectively, and each component is an 8-bit unsigned integer (i.e. an integer ranging from 0 to 255) to provide 256 different shades. The RGB value (i, i, i) represents the i-th shade of gray (hereinafter called grayscale) where i is an integer ranging from 0 to 255. (0, 0, 0) represents the zeroth grayscale or the minimum grayscale (i.e. black). (255, 255, 255) represents the 255th grayscale or the maximum grayscale (i.e. white). The RGB value (i, 0, 0), notated as Ri, represents the i-th shade of red (hereinafter called grayscale of red). (255, 0, 0) or R255 represents the 255th grayscale of red (i.e. red). The RGB value (0, i, 0), notated as Gi, represents the i-th shade of green (hereinafter called grayscale of green). (0, 255, 0) or G255 represents the 255th grayscale of green (i.e. green). The RGB value (0, 0, i), notated as Bi, represents the i-th shade of blue (hereinafter called grayscale of blue). (0, 0, 255) or B255 represents the 255th grayscale of blue (i.e. blue).

Figure 1A:
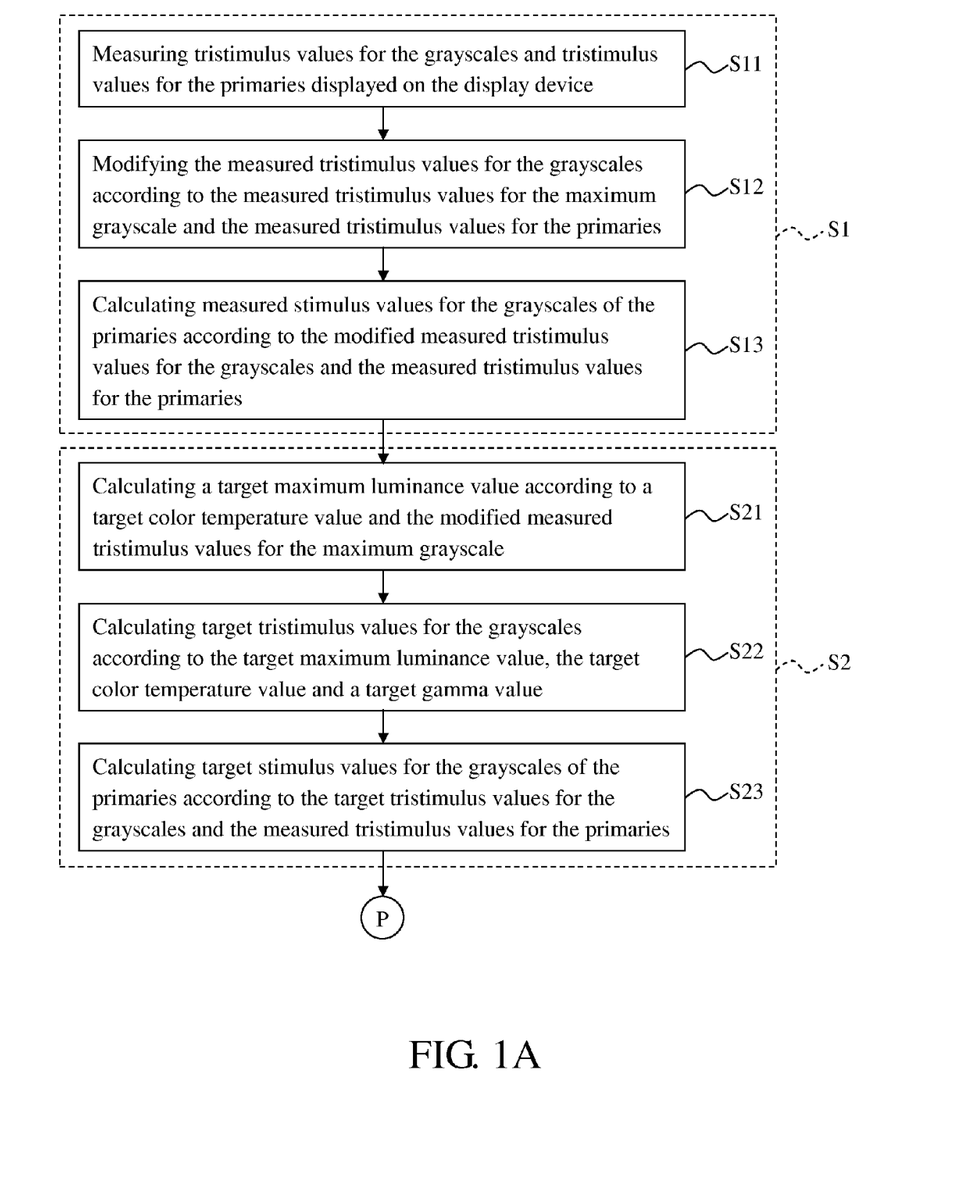
FIGS. 1A and 1B are a flowcharts illustrating a method for generating a lookup table for color correction for a display device according to an embodiment of the present invention.
Figure 1B:
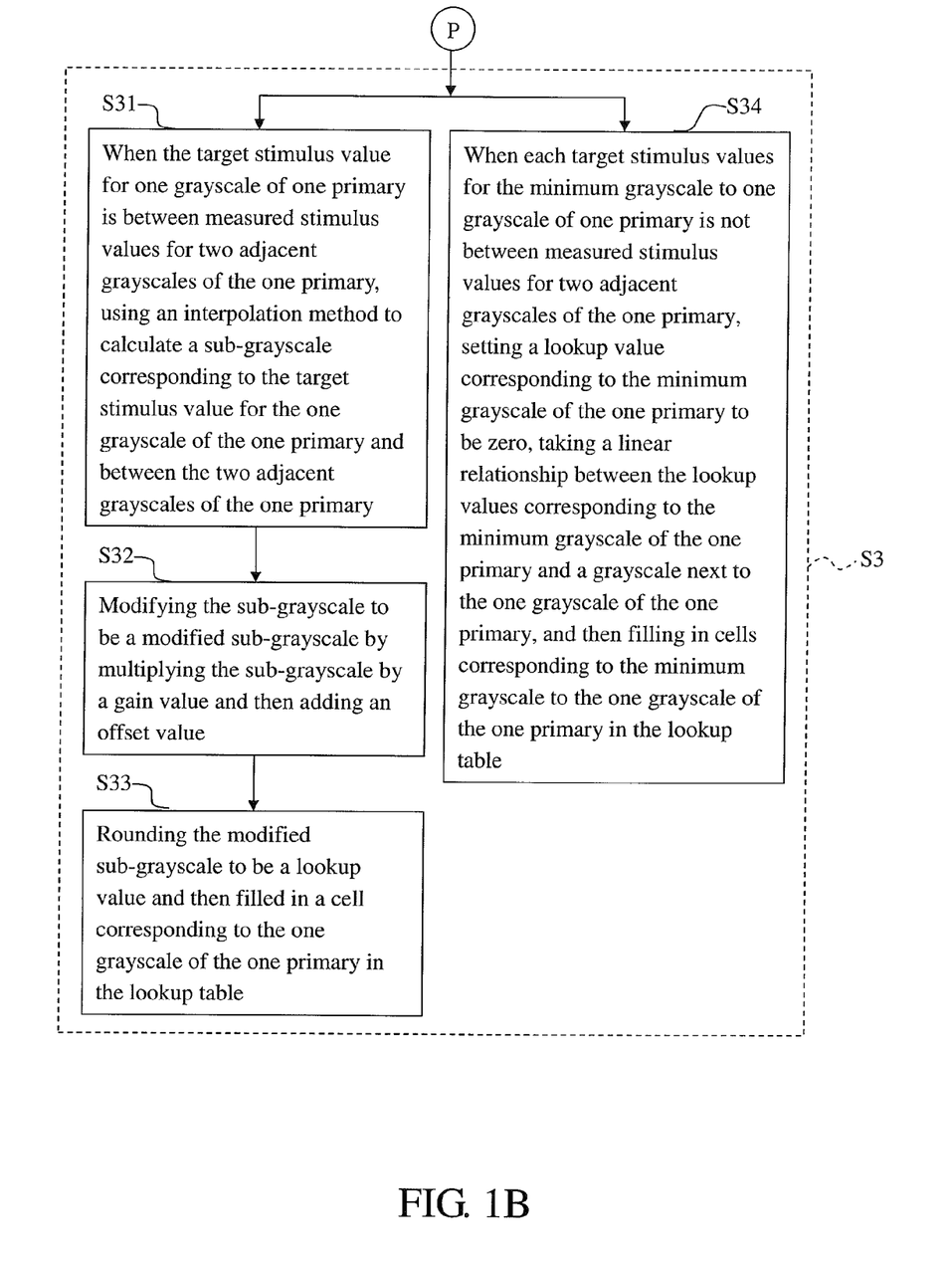

FIGS. 1A and 1B are a flowcharts illustrating a method for generating a lookup table for color correction for a display device according to an embodiment of the present invention. Referring to FIGS. 1A and 1B, a method for generating a lookup table for color correction for a display device sequentially includes three major steps S1-S3. The step S1 is to obtain measured stimulus values for the grayscales of the primaries for the display device. The step S2 is to obtain target stimulus values for the grayscales of the primaries for the display device. The step S3 is to obtain the lookup table for color correction for the display device by comparing the measured stimulus values for the grayscales of the primaries and the target stimulus values for the grayscales of the primaries. The display device can use the lookup table to adjust the color temperature and the brightness curve of the display device.

In this embodiment, the step S1 sequentially includes steps S11-S13 for obtaining the measured stimulus values for the grayscales of the primaries for the display device. At the step S11, an instrument is used to measure corresponding images displayed on the display device to measure tristimulus values for the grayscales and tristimulus values for the primaries to obtain the measured tristimulus values for the grayscales ($X_0''$-$X_{255}''$, $Y_0''$-$Y_{255}''$ and $Z_0''$-$Z_{255}''$ shown in the upper table in FIG. 2) and the measured tristimulus values for the primaries ($X_{R255}$, $Y_{R255}$, $Z_{R255}$, $X_{G255}$, $Y_{G255}$, $Z_{G255}$, $X_{B255}$, $Y_{B255}$ and $Z_{B255}$ shown in the lower table in FIG. 2), where the tristimulus values include X, Y and Z stimulus values, the grayscales include the zeroth to the 255th grayscales, and the primaries include red (R255), green (G255) and blue (B255). The measured tristimulus values for the grayscales ($X_0''$-$X_{255}''$, $Y_0''$-$Y_{255}''$ and $Z_0''$-$Z_{255}''$) include the measured tristimulus values for the zeroth grayscale ($X_0''$, $Y_0''$ and $Z_0''$), the measured tristimulus values for the first grayscale ($X_1''$, $Y_1''$ and $Z_1''$), . . . , and the measured tristimulus values for the 255th grayscale ($X_{255}''$, $Y_{255}''$ and $Z_{255}''$). The measured tristimulus values for the primaries ($X_{R255}$, $Y_{R255}$, $Z_{R255}$, $X_{G255}$, $Y_{G255}$, $Z_{G255}$, $X_{B255}$, $Y_{B255}$ and $Z_{B255}$) include the measured tristimulus values for red ($X_{R255}$, $Y_{R255}$ and $Z_{R255}$), the measured tristimulus values for green ($X_{G255}$, $Y_{G255}$ and $Z_{G255}$) and the measured tristimulus values for blue ($X_{B255}$, $Y_{B255}$ and $Z_{B255}$).

According to the principle of additive color mixing, it is ideal that $X_{255}''=X_{R255}+X_{G255}+X_{B255}$, $Y_{255}''=Y_{R255}+Y_{G255}+Y_{B255}$ and $Z_{255}''=Z_{R255}+Z_{G255}+Z_{B255}$. However, because of observational errors or other factors, it is practical that $X_{255}''\approx X_{R255}+X_{G255}+X_{B255}$, $Y_{255}''\approx Y_{R255}+Y_{G255}+Y_{B255}$ and $Z_{255}''\approx Z_{R255}+Z_{G255}+Z_{B255}$ and, if necessary, they can be modified. When they need to be modified, at the step S12, according to the measured tristimulus values for the maximum grayscale ($X_{255}''$, $Y_{255}''$ and $Z_{255}''$) and the measured tristimulus values for the primaries ($X_{R255}$, $Y_{R255}$, $Z_{R255}$, $X_{G255}$, $Y_{G255}$, $Z_{G255}$, $X_{B255}$, $Y_{B255}$ and $Z_{B255}$) the measured tristimulus values for the grayscales ($X_0''$-$X_{255}''$, $Y_0''$-$Y_{255}''$ and $Z_0''$-$Z_{255}''$) will be modified to obtain the modified measured tristimulus values for the grayscales ($X_0$-$X_{255}$, $Y_0$-$Y_{255}$ and $Z_0$-$Z_{255}$ shown in FIG. 3) which include the modified measured X stimulus values for the grayscales ($X_0$-$X_{255}$), the modified measured Y stimulus values for the grayscales ($Y_0$-$Y_{255}$) and the modified measured Z stimulus values for the grayscales ($Z_0$-$Z_{255}$). In one embodiment, $X_0$-$X_{255}$ are obtained by multiplying $X_0''$-$X_{255}''$ each by a first modified factor obtained by dividing ($X_{R255}+X_{G255}+X_{B255}$) by $X_{255}''$, $Y_0$-$Y_{255}$ are obtained by multiplying $Y_0''$-$Y_{255}''$ each by a second modified factor obtained by dividing ($Y_{R255}+Y_{G255}+Y_{B255}$) by $Y_{255}''$, and $Z_0$-$Z_{255}$ are obtained by multiplying $Z_0''$-$Z_{255}''$ each by a third modified factor obtained by dividing ($Z_{R255}+Z_{G255}+Z_{B255}$) by $Z_{255}''$.

At the step S13, according to the modified measured tristimulus values for the grayscales ($X_0$-$X_{255}$, $Y_0$-$Y_{255}$ and $Z_0$-$Z_{255}$ shown in FIG. 3) and the measured tristimulus values for the primaries ($X_{R255}$, $Y_{R255}$, $Z_{R255}$, $X_{G255}$, $Y_{G255}$, $Z_{G255}$, $X_{B255}$, $Y_{B255}$ and $Z_{B255}$ shown in FIG. 2), the measured stimulus values for the grayscales of the primaries ($X_{R0}$-$X_{R255}$, $Y_{G0}$-$Y_{G255}$ and $Z_{B0}$-$Z_{B255}$ shown in FIG. 4) are calculated, where the grayscales of the primaries include the grayscales of red (R0-R255), the grayscales of green (G0-G255) and the grayscales of blue (B0-B255). The measured stimulus values for the grayscales of the primaries ($X_{R0}$-$X_{R255}$, $Y_{G0}$-$Y_{G255}$ and $Z_{B0}$-$Z_{B255}$) include the measured X stimulus values for the grayscales of red ($X_{R0}$-$X_{R255}$), the measured Y stimulus values for the grayscales of green ($Y_{G0}$-$Y_{G255}$) and the measured Z stimulus values for the grayscales of blue ($Z_{B0}$-$Z_{B255}$).

In one embodiment, the relationship of the modified measured tristimulus values for the i-th grayscale ($X_i$, $Y_i$ and $Z_i$, where i is an integer ranging from 0 to 255) and the measured tristimulus values for the primaries ($X_{R255}$, $Y_{R255}$, $Z_{R255}$, $X_{G255}$, $Y_{G255}$, $Z_{G255}$, $X_{B255}$, $Y_{B255}$ and $Z_{B255}$) can be expressed as follows:

$$X_{R255} \times I_i + X_{G255} \times J_i + X_{B255} \times K_i = X_i$$

$$Y_{R255} \times I_i + Y_{G255} \times J_i + Y_{B255} \times K_i = Y_i$$

$$Z_{R255} \times I_i + Z_{G255} \times J_i + Z_{B255} \times K_i = Z_i$$

Substituting the values of $X_i$, $Y_i$, $Z_i$ shown in FIG. 3 and $X_{R255}$, $X_{G255}$, $X_{B255}$, $Y_{R255}$, $Y_{G255}$, $Y_{B255}$, $Z_{R255}$, $Z_{G255}$, $Z_{B255}$ shown in FIG. 2 into the above equations and solving them simultaneously yield the solutions for $I_i$, $J_i$ and $K_i$. Then, substituting the solutions for $I_i$, $J_i$ and $K_i$ into the formulas $$X_{Ri}=X_{R255}\times I_i$$

$$Y_{Gi}=Y_{G255}\times J_i$$

$$Z_{Bi}=Z_{B255}\times K_i$$

yields the measured X stimulus value for the i-th grayscale of red ($X_{Ri}$), the measured Y stimulus value for the i-th grayscale of green ($Y_{Gi}$) and the measured Z stimulus value for the i-th grayscale of blue ($Z_{Bi}$), for all i, to obtain the measured stimulus values for the grayscales of the primaries ($X_{R0}$-$X_{R255}$, $Y_{G0}$-$Y_{G255}$ and $Z_{B0}$-$Z_{B255}$).

For example, taking the modified measured tristimulus values for the 128th grayscale ($X_{128}$, $Y_{128}$ and $Z_{128}$) as an example, they can be expressed as follows:

$$185.0448\times I_{128}+145.8495\times J_{128}+111.1191\times K_{128}=93.51114$$

$$98.0262\times I_{128}+311.0104\times J_{128}+43.58617\times K_{128}=95.79320$$

$$7.121009\times I_{128}+70.13288\times J_{128}+613.829\times K_{128}=142.9727$$

Solving the above equations simultaneously yields the solutions: $I_{128}=0.214873807$, $J_{128}=0.211372809$ and $K_{128}=0.206276337$. Then, substituting the solutions $I_{128}$, $J_{128}$ and $K_{128}$ into the above formulas $X_{R128}=X_{R255}\times I_{128}$, $Y_{G128}=Y_{G255}\times J_{128}$ and $Z_{B128}=Z_{B255}\times K_{128}$ yields $X_{R128}=39.76128$, $Y_{G128}=65.73914$ and $Z_{B128}=126.6184$.

In another embodiment, the measured stimulus values for the grayscales of the primaries ($X_{R0}$-$X_{R255}$, $Y_{G0}$-$Y_{G255}$ and $Z_{B0}$-$Z_{B255}$) can be directly measured by using the instrument to measure corresponding images displayed on the display device rather than calculating according to the modified measured tristimulus values for the grayscales ($X_0$-$X_{255}$, $Y_0$-$Y_{255}$ and $Z_0$-$Z_{255}$) and the measured tristimulus values for the primaries ($X_{R255}$, $Y_{R255}$, $Z_{R255}$, $X_{G255}$, $Y_{G255}$, $Z_{G255}$, $X_{B255}$, $Y_{B255}$ and $Z_{B255}$).

In this embodiment, the step S2 sequentially includes steps S21-S23 for obtaining the target stimulus values for the grayscales of the primaries for the display device. At the step S21, according to a target color temperature value (corresponding to chromaticity coordinates x and y) and the modified measured tristimulus values for the maximum grayscale ($X_{255}$, $Y_{255}$ and $Z_{255}$ shown in FIG. 3), a target maximum luminance value ($L_{MAX}$) is calculated. In one embodiment, taking the target color temperature value corresponding to the chromaticity coordinates x=0.313 and y=0.329 as an example, it is assumed that among the modified measured tristimulus values for the maximum grayscale ($X_{255}$, $Y_{255}$ and $Z_{255}$), the modified measured X stimulus value ($X_{255}$) has the highest luminance, and, then, the assumption is verified. First, according to the relationship of X, Y and Z stimulus values and x, y and z normalized stimulus values, the modified measured tristimulus values under the assumption are calculated as follows:

$$X_{MAX}=X_{255}=442.0134$$

$$Y_{XMAX}=X_{MAX}\times(y/x)=442.0134\times 0.329/0.313=464.6083342$$

$$Z_{XMAX}=Y_{XMAX}\times(1-x-y)/y=464.6083342\times(1-0.313-0.329)/0.329=505.5616524$$

Next, the relationship of the modified measured tristimulus values under the assumption ($X_{MAX}$, $Y_{XMAX}$ and $Z_{XMAX}$) and the measured tristimulus values for the primaries ($X_{R255}$, $Y_{R255}$, $Z_{R255}$, $X_{G255}$, $Y_{G255}$, $Z_{G255}$, $X_{B255}$, $Y_{B255}$ and $Z_{B255}$) can be expressed as follows:

$$X_{R255}\times U_{255}+X_{G255}\times V_{255}+X_{B255}\times W_{255}=X_{MAX}$$

$$Y_{R255}\times U_{255}+Y_{G255}\times V_{255}+Y_{B255}\times W_{255}=Y_{XMAX}$$

$$Z_{R255}\times U_{255}+Z_{G255}\times V_{255}+Z_{B255}\times W_{255}=Z_{XMAX}$$

Substituting the values of $X_{MAX}$, $Y_{XMAX}$, $Z_{XMAX}$ calculated above and $X_{R255}$, $X_{G255}$, $X_{B255}$, $Y_{R255}$, $Y_{G255}$, $Y_{B255}$, $Z_{R255}$, $Z_{G255}$, $Z_{B255}$ shown in FIG. 2 into the above equations and solving them simultaneously yield the solutions: $U_{255}=1.160181522$, $V_{255}=1.03116645$ and $W_{255}=0.6923448$. Because the value of $U_{255}$ is the greatest among the values of $U_{255}$, $V_{255}$ and $W_{255}$, the assumption that the modified measured X stimulus value ($X_{255}$) has the highest luminance is correct. However, if the assumption that the modified measured X stimulus value ($X_{255}$) has the highest luminance is not correct, it is changed to assume that the modified measured Y stimulus value ($Y_{255}$) has the highest luminance, and then the assumption is verified by calculating $U_{255}$, $V_{255}$ and $W_{255}$ again and judging whether the value of $V_{255}$ is the greatest. If the assumption that the modified measured Y stimulus value ($Y_{255}$) has the highest luminance is still not correct, it is certain that the modified measured Z stimulus value ($Z_{255}$) has the highest luminance. The values of $U_{255}$, $V_{255}$ and $W_{255}$ are calculated again, and, now, the value of $W_{255}$ is undoubtedly the greatest.

In order to cause the target maximum luminance value ($L_{MAX}$) to fit with the maximum luminance value which the display device can achieve in practice, the values of $U_{255}$, $V_{255}$ and $W_{255}$ should be divided by the greatest one of the values of $U_{255}$, $V_{255}$ and $W_{255}$ to provide the correct proportions to calculate the target maximum luminance value ($L_{MAX}$). In this embodiment, the value of $U_{255}$ is the greatest, and the target maximum luminance value ($L_{MAX}$) is expressed as follows:

$$L_{MAX}=Y_{R255}\times(U_{255}/U_{255})+Y_{G255}\times(V_{255}/U_{255})+Y_{B255}\times(W_{255}/U_{255})=400.4617599$$

At the step S22, according to the target maximum luminance value ($L_{MAX}$), the target color temperature value (corresponding to chromaticity coordinates x and y) and a target gamma value ($\gamma$), target tristimulus values for the grayscales ($X_0'$-$X_{255}'$, $Y_0'$-$Y_{255}'$ and $Z_0'$-$Z_{255}'$ shown in FIG. 5) are calculated. In one embodiment, the target tristimulus values for the i-th grayscale ($X_i'$, $Y_i'$ and $Z_i'$, where i is an integer ranging from 0 to 255) are expressed as follows:

$$Y_i'=L_{MAX}\times(i/255)^\gamma+Y_0$$

$$X_i'=Y_i'\times x/y$$

$$Z_i'=Y_i'\times(1-x-y)/y$$

Continuing the above example, taking the target tristimulus values for the 128th grayscale ($X_{128}'$, $Y_{128}'$ and $Z_{128}'$) as an example, assuming that the target gamma value $\gamma$ is 2.2 and substituting the values of $L_{MAX}$, $\gamma$, $Y_0$, x and y into the above formulas yields:

$$Y_{128}'=400.4617599\times(128/255)^{2.2}+0.1073202=88.01657283$$

$$X_{128}'=88.01657283\times 0.313/0.329=83.7361316$$

$$Z_{128}'=88.01657283\times(1-0.313-0.329)/0.329=95.77487256$$

At the step S23, according to the target tristimulus values for the grayscales ($X_0'$-$X_{255}'$, $Y_0'$-$Y_{255}'$ and $Z_0'$-$Z_{255}'$ shown in FIG. 5) and the measured tristimulus values for the primaries ($X_{R255}$, $Y_{R255}$, $Z_{R255}$, $X_{G255}$, $Y_{G255}$, $Z_{G255}$, $X_{B255}$, $Y_{B255}$ and $Z_{B255}$ shown in FIG. 2), the target stimulus values for the grayscales of the primaries ($X_{R0}'$-$X_{R255}'$, $Y_{G0}'$-$Y_{G255}'$ and $Z_{B0}'$-$Z_{B255}'$ shown in FIG. 6) are calculated. In one embodiment, the relationship of the target tristimulus values for the i-th grayscale ($X_i'$, $Y_i'$ and $Z_i'$, where i is an integer ranging from 0 to 255) and the measured tristimulus values for the primaries ($X_{R255}$, $Y_{R255}$, $Z_{R255}$, $X_{G255}$, $Y_{G255}$, $Z_{G255}$, $X_{B255}$, $Y_{B255}$ and $Z_{B255}$) can be expressed as follows:

$$X_{R255} \times U_i + X_{G255} \times V_i + X_{B255} \times W_i = X_i'$$

$$Y_{R255} \times U_i + Y_{G255} \times V_i + Y_{B255} \times W_i = Y_i'$$

$$Z_{R255} \times U_i + Z_{G255} \times V_i + Z_{B255} \times W_i = Z_i'$$

Substituting the values of $X_i'$, $Y_i'$, $Z_i'$ shown in FIG. 5 and $X_{R255}$, $X_{G255}$, $X_{B255}$, $Y_{R255}$, $Y_{G255}$, $Y_{B255}$, $Z_{R255}$, $Z_{G255}$, $Z_{B255}$ shown in FIG. 2 into the above equations and solving them simultaneously yield the solutions for $U_i$, $V_i$ and $W_i$. Then, substituting the solutions for $U_i$, $V_i$ and $W_i$ into the formulas $$X_{Ri}' = X_{R255} \times U_i$$

$$Y_{Gi}' = Y_{G255} \times V_i$$

$$Z_{Bi}' = Z_{B255} \times W_i$$

yields the target X stimulus value for the i-th grayscale of red ($X_{Ri}'$), the target Y stimulus value for the i-th grayscale of green ($Y_{Gi}'$) and the target Z stimulus value for the i-th grayscale of blue ($Z_{Bi}'$), for all i, to obtain the target stimulus values for the grayscales of the primaries ($X_{R0}'$-$X_{R255}'$, $Y_{G0}'$-$Y_{G255}'$ and $Z_{B0}'$-$Z_{B255}'$).

Continuing the above example, taking the target tristimulus values for the 128th grayscale ($X_{128}'$, $Y_{128}'$ and $Z_{128}'$) as an example, they can be expressed as follows:

$$185.0448 \times U_{128} + 145.8495 \times V_{128} + 111.1191 \times W_{128} = 83.7361316$$

$$98.0262 \times U_{128} + 311.0104 \times V_{128} + 43.58617 \times W_{128} = 88.01657283$$

$$7.121009 \times U_{128} + 70.13288 \times V_{128} + 613.829 \times W_{128} = 95.77487256$$

Solving the above equations simultaneously yields the solutions: $U_{128} = 0.219787709$, $V_{128} = 0.195346769$ and $W_{128} = 0.131159542$. Then, substituting the solutions $U_{128}$, $V_{128}$ and $W_{128}$ into the above formulas $X_{R128}' = X_{R255} \times U_{128}$, $Y_{G128}' = Y_{G255} \times V_{128}$ and $Z_{B128}' = Z_{B255} \times W_{128}$ yields $X_{R128}' = 40.67057$, $Y_{G128}' = 60.75488$ and $Z_{B128}' = \mathbf{80.50953}$.

Figure 7:
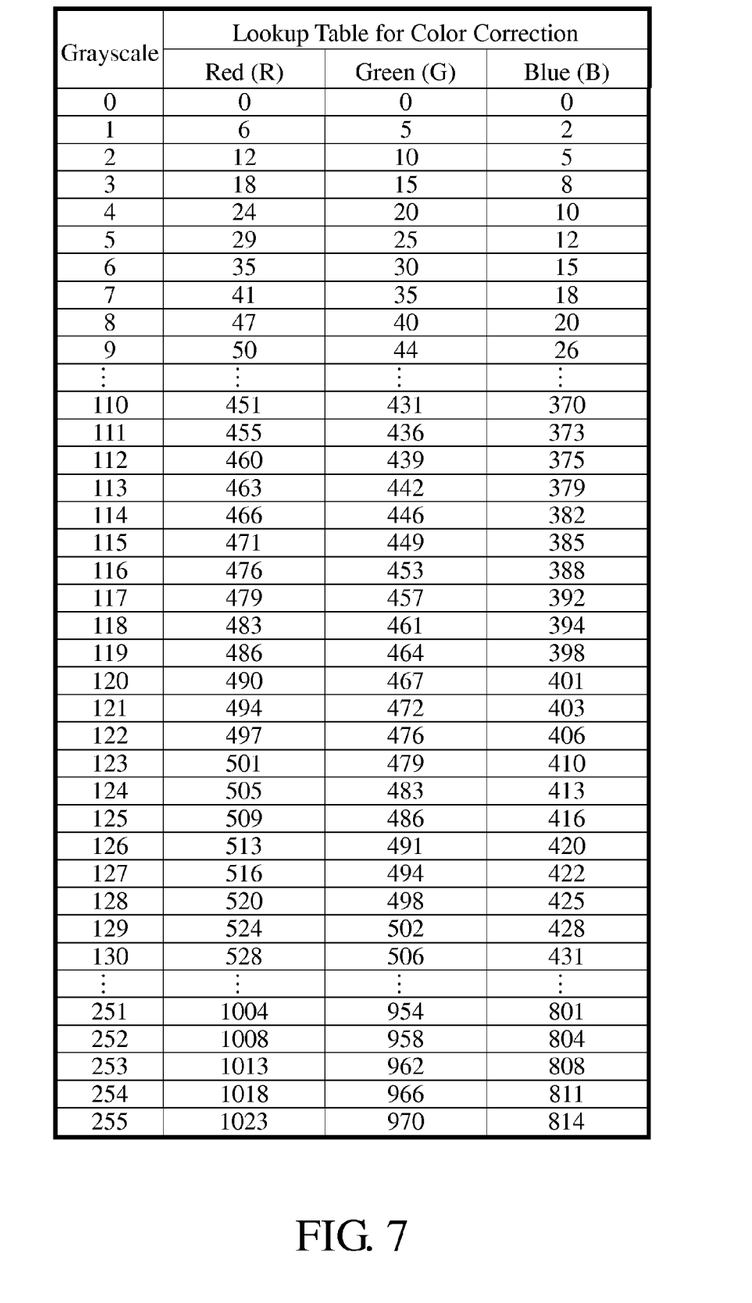
FIG. 7 is a table illustrating the lookup table for color correction for the display device obtained according to the step S3 shown in FIG. 1B.

In this embodiment, the step S3 sequentially includes steps S31-S34 for obtaining the lookup table (shown in FIG. 7) for color correction for the display device by comparing the measured stimulus values for the grayscales of the primaries ($X_{R0}$-$X_{R255}$, $Y_{G0}$-$Y_{G255}$ and $Z_{B0}$-$Z_{B255}$ shown in FIG. 4) and the target stimulus values for the grayscales of the primaries ($X_{R0}'$-$X_{R255}'$, $Y_{G0}'$-$Y_{G255}'$ and $Z_{B0}'$-$Z_{B255}'$ shown in FIG. 6). At the step S31, when the target stimulus value for one grayscale of one primary is between measured stimulus values for two adjacent grayscales of the one primary, an interpolation method is used to calculate a sub-grayscale corresponding to the target stimulus value for the one grayscale of the one primary and is between the two adjacent grayscales of the one primary. In one embodiment, the sub-grayscale is rounded (such as rounded off to the integer) to be a lookup value and then filled in a cell corresponding to the one grayscale of the one primary in the lookup table. The sub-grayscale can be further processed, if necessary, to increase data resolution. In this embodiment, to increase data resolution, at the step S32, the sub-grayscale is modified to be a modified sub-grayscale by multiplying the sub-grayscale by a gain value and then adding an offset value. At the step S33, the modified sub-grayscale is rounded (such as rounded off to the integer) to be a lookup value and then filled in a cell corresponding to the one grayscale of the one primary in the lookup table.

Continuing the above example, taking the target stimulus value for the 128th grayscale of red ($X_{R128}'$) as an example, the target stimulus value for the 128th grayscale of red ($X_{R128}'$) is 40.67057 which is between 40.50521 ($X_{R129}$) and 41.26324 ($X_{R130}$). That is, the target stimulus value for the 128th grayscale of red ($X_{R128}'$) is between the measured stimulus values for the two adjacent grayscales of red ($X_{R129}$ and $X_{R130}$) where the two adjacent grayscales are of red are R129 and R130. Next, a linear interpolation method is used to calculate a sub-grayscale (about 129.2) corresponding to the target stimulus value for the 128th grayscale of red ($X_{R128}'$) and is between the two adjacent grayscales of red (R129 and R130). To increase data resolution, the sub-grayscale (129.2) is modified to be a modified sub-grayscale (129.2×4+3=519.8) by multiplying the sub-grayscale (129.2) by a gain value (4) and then adding an offset value (3). In this case, the gain value (4) can expand the maximum grayscale from the 255th grayscale to the 1020th grayscale, and, then, the offset value (3) can shift the 1020th grayscale to the 1023th grayscale, so that the gain value (4) and the offset value (3) can increase data resolution of each component of (r, g, b) from an 8-bit unsigned integer (providing the zeroth to the 255th grayscales or 256 shades) to a 10-bit unsigned integer (providing the zeroth to the 1023th grayscales or 1024 shades). Finally, the modified sub-grayscale (519.8) is rounded off to the integer to be a lookup value (520) and then filled in a cell corresponding to the 128th grayscale of red in the lookup table shown in FIG. 7, where the cell is the intersection of a column of red (R) and a row of the 128th grayscale.

At the step S34, when the target stimulus values for the minimum grayscale to one grayscale of one primary each are not between measured stimulus values for two adjacent grayscales of the one primary, setting a lookup value corresponding to the minimum grayscale of the one primary to be zero, taking a linear relationship between the lookup values corresponding to the minimum grayscale of the one primary and a grayscale next to the one grayscale of the one primary to obtain lookup values and then filling in cells corresponding to the minimum grayscale to the one grayscale of the one primary in the lookup table.

Continuing the above example, taking the target stimulus values for the grayscales of blue ($Z_{B0}'$-$Z_{B255}'$ shown in FIG. 6) as an example, each target stimulus values for the zeroth to the seventh grayscales of blue ($Z_{B0}'$-$Z_{B7}'$) is not between measured stimulus values for two adjacent grayscales of blue, and each target stimulus values for the seventh to the 255th grayscales of blue ($Z_{B8}'$-$Z_{B255}' \propto$) is between measured stimulus values for two adjacent grayscales of blue. In this case, the lookup value corresponding to the minimum grayscale of blue (B0) is set to be zero, and the lookup value corresponding to the grayscale next to the seventh grayscale of blue (B8) is 20 obtained from the steps S31-S33. Taking a linear relationship between the lookup values corresponding to B0 and B8 (i.e. 0 and 20), respectively, obtains lookup values corresponding to B0 and B7 (i.e. 0, 2, 5, 8, 10, 12, 15 and 18). Then, the lookup values corresponding to B0 and B7 are filled in cells corresponding to B0 and B7 in the lookup table.

Furthermore, in one embodiment, the present invention stores the measured tristimulus values for the grayscales ($X_0''$-$X_{255}''$, $Y_0''$-$Y_{255}''$ and $Z_0''$-$Z_{255}''$) and the measured tristimulus values for the primaries ($X_{R255}$, $Y_{R255}$, $Z_{R255}$, $X_{G255}$, $Y_{G255}$, $Z_{G255}$, $X_{B255}$, $Y_{B255}$ and $Z_{B255}$) obtained from the step S11 in a storage unit (such as an EEPROM) of the display device, and implements the steps S12, S13, S2 and S3 by a program which can be executed by a processor of the display device. It results in reduced storage space for storing data for color correction and adjustable gamma value ($\gamma$) and color temperature value (corresponding to chromaticity coordinates x and y).

In summary, the present invention uses the measured display characteristic to calculate the corresponding lookup table for color correction for the display device for achieving a desired color temperature and brightness curve. It makes the adjustment of color temperature and brightness more accurate and quicker, to reduce cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

I claim:

1. A method for generating a lookup table for color correction comprising:
   measuring tristimulus values for grayscales and tristimulus values for primaries displayed on a display device;
   storing the measured tristimulus values for the grayscales and the measured tristimulus values for the primaries in a storage unit of the display device;
   calculating measured stimulus values for the grayscales of the primaries according to the measured tristimulus values for the grayscales and the measured tristimulus values for the primaries in a processor of the display device;
   calculating a target maximum luminance value according to a target color temperature value and the measured tristimulus values for a maximum grayscale in the processor;
   calculating target tristimulus values for the grayscales according to the target maximum luminance value, the target color temperature value and a target gamma value in the processor;
   calculating target stimulus values for the grayscales of the primaries according to the target tristimulus values for the grayscales and the measured tristimulus values for the primaries in the processor; and
   when the target stimulus value for one grayscale of one primary is between measured stimulus values for two adjacent grayscales of the one primary, the processor using an interpolation method to calculate a sub-grayscale corresponding to the target stimulus value for the one grayscale of the one primary and between the two adjacent grayscales of the one primary, rounding the sub-grayscale to be a lookup value and then filling the lookup value in a cell corresponding to the one grayscale of the one primary in the lookup table.

2. The method according to claim 1, wherein when each of the target stimulus values for a minimum grayscale to the one grayscale of the one primary is not between measured stimulus values for the two adjacent grayscales of the one primary, the processor setting a lookup value corresponding to the minimum grayscale of the one primary to be zero, taking a linear relationship between the lookup values corresponding to the minimum grayscale of the one primary and a grayscale next to the one grayscale of the one primary, and then filling in cells corresponding to the minimum grayscale to the one grayscale of the one primary in the lookup table.

3. The method according to claim 1, wherein calculating the measured stimulus values for the grayscales of the primaries in the processor further comprises:
   modifying the measured tristimulus values for the grayscales according to the measured tristimulus values for the maximum grayscale and the measured tristimulus values for the primaries; and
   replacing the measured tristimulus values for the grayscales by the modified measured tristimulus values for the grayscales.

4. The method according to claim 1, wherein before rounding the sub-grayscale to be the lookup value, further comprising:
   modifying the sub-grayscale to be a modified sub-grayscale by multiplying the sub-grayscale by a gain value and then adding an offset value in the processor; and
   rounding the modified sub-grayscale to be a lookup value and then filling the lookup value in the cell corresponding to the one grayscale of the one primary in the lookup table.

5. The method according to claim 1, wherein the primaries comprise red, green and blue.

6. The method according to claim 1, wherein the tristimulus values comprise X, Y and Z stimulus values.

7. The method according to claim 6, wherein the tristimulus values are replaced by xyY, Luv or Lab values derived from the X, Y and Z stimulus values.

8. The method according to claim 1, wherein the display device comprises a liquid crystal display (LCD) monitor or an LCD television.

9. A method for generating a lookup table for color correction comprising:
   measuring tristimulus values for grayscales and tristimulus values for primaries displayed on a display device;
   storing the measured tristimulus values for the grayscales and the measured tristimulus values for the primaries in a storage unit of the display device;
   calculating measured stimulus values for the grayscales of the primaries according to the measured tristimulus values for the grayscales and the measured tristimulus values for the primaries in a processor of the display device;
   calculating a target maximum luminance value according to a target color temperature value and the measured tristimulus values for a maximum grayscale in the processor;
   calculating target tristimulus values for the grayscales according to the target maximum luminance value, the target color temperature value and a target gamma value in the processor;
   calculating target stimulus values for the grayscales of the primaries according to the target tristimulus values for the grayscales and the measured tristimulus values for the primaries in the processor; and
   when each of the target stimulus values for a minimum grayscale to one grayscale of one primary is not between measured stimulus values for two adjacent grayscales of the one primary, the processor setting a lookup value corresponding to the minimum grayscale of the one primary to be zero, taking a linear relationship between the lookup values corresponding to the minimum grayscale of the one primary and a grayscale next to the one grayscale of the one primary, and then filling in cells corresponding to the minimum grayscale to the one grayscale of the one primary in the lookup table.

10. The method according to claim 9, wherein when the target stimulus value for one grayscale of one primary is between measured stimulus values for two adjacent grayscales of the one primary, the processor using an interpolation method to calculate a sub-grayscale corresponding to the target stimulus value for the one grayscale of the one primary and between the two adjacent grayscales of the one primary, rounding the sub-grayscale to be a lookup value and then filling the lookup value in a cell corresponding to the one grayscale of the one primary in the lookup table.

11. The method according to claim 10, wherein before rounding the sub-grayscale to be the lookup value in the processor, comprising:
   modifying the sub-grayscale to be a modified sub-grayscale by multiplying the sub-grayscale by a gain value and then adding an offset value; and
   rounding the modified sub-grayscale to be a lookup value and then filling the lookup value in the cell corresponding to the one grayscale of the one primary in the lookup table.

12. The method according to claim 9, wherein calculating the measured stimulus values for the grayscales of the primaries in the processor further comprises:
   modifying the measured tristimulus values for the grayscales according to the measured tristimulus values for the maximum grayscale and the measured tristimulus values for the primaries; and
   replacing the measured tristimulus values for the grayscales by the modified measured tristimulus values for the grayscales.

13. The method according to claim 9, wherein the primaries comprise red, green and blue.

14. The method according to claim 9, wherein the tristimulus values comprise X, Y and Z stimulus values.

15. The method according to claim 14, wherein the tristimulus values are replaced by xyY, Luv or Lab values derived from the X, Y and Z stimulus values.

16. The method according to claim 9, wherein the display device comprises a liquid crystal display (LCD) monitor or an LCD television.

* * * * *